F. BOCKHACKER.
HYDROSTATIC SCALE.
No. 171,760.  Patented Jan. 4, 1876.
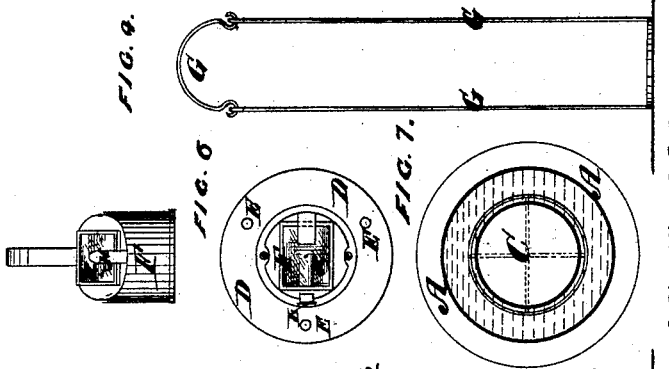
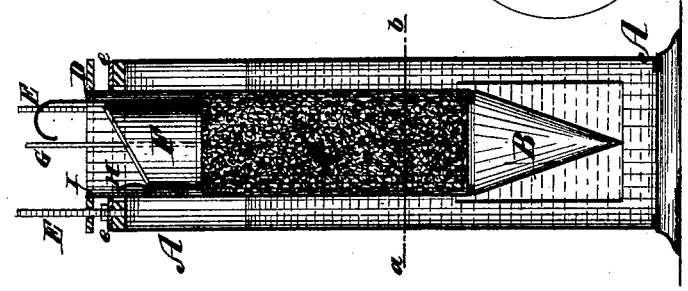
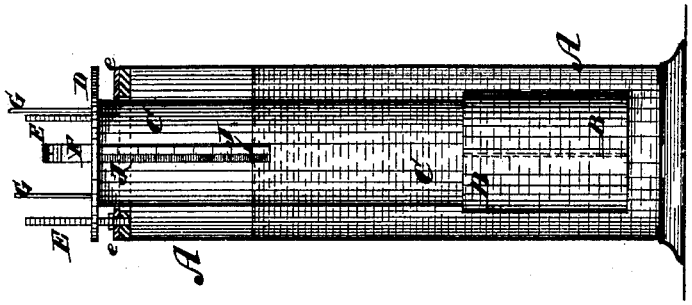
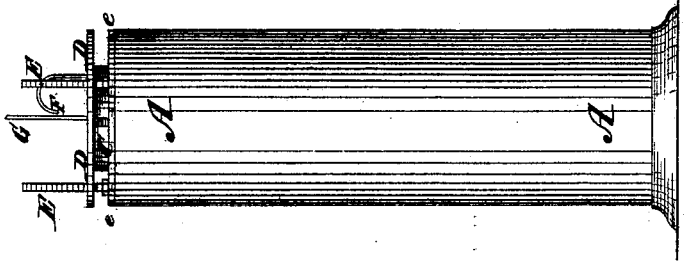
Witnesses
Chas. H. Smith
Harold Serrell
Inventor
Friedrich Bockhacker
per L. W. Serrell
Atty.

UNITED STATES PATENT OFFICE.

FRIEDRICH BOCKHACKER, OF HÜCKESWAGEN, RHENISH PRUSSIA.

IMPROVEMENT IN HYDROSTATIC SCALES.

Specification forming part of Letters Patent No. 171,760, dated January 4, 1876; application filed October 16, 1875.

*To all whom it may concern:*

Be it known that I, FRIEDRICH BOCKHACKER, of Hückeswagen, in Rhenish Prussia, have invented a certain invention entitled a new or improved mode of and apparatus or balance for ascertaining the loss of wool in weight by the process of washing or cleansing, of which the following is a specification:

The apparatus constituting the invention of the said BOCKHACKER consists, mainly, of a deep vessel which is partly filled with water or other fluid, and wherein is situate a combined float and wool-receptacle, into which latter the wool is packed and pressed, the cubic contents thereof being measured by the natural resilience of the wool upon being relieved from pressure, acting upon a superposed weight provided with a pointer so arranged as to mark off upon a scale the cubic contents of the wool-receptacle. The weight of the contained wool is discovered by noting the distance which the float and wool-receptacle sink in the outer water cistern or vessel, scales being also provided for that purpose.

Figure 1 on the annexed sheet of drawings is an elevation; Fig. 2, a partial section; Fig. 3, a complete vertical section; and Figs. 4, 5, 6, and 7, plan, sectional, and detailed views, respectively, of my improved wool weighing and measuring apparatus, which consists, as shown, of an outer vessel, A, which is partially filled with water or other fluid, and within which is situate another inner vessel, the lower part of which constitutes a float, B, while the upper part C is a receptacle to contain the wool to be weighed and measured. The float B and receptacle C are upborne by the water or other fluid, and are free to rise and fall in the outer vessel A, an india-rubber or other packing, e, being provided at the upper part of the vessel A, to encircle the receptacle C and prevent the escape of the fluid from the outer vessel. A flange, D, is fixed to the upper part of the vessel or receptacle C, through which flange D guide-rods E are, or may be, passed, so as to steady the float B and vessel C as they rise and fall; and the said guide-rods E may be divided into degrees and employed as scales to ascertain the rise and fall of the float and vessel, or a scale, J, may be provided for that purpose and fixed upon the side of the receptacle C, as shown at Fig. 2, in which case the guide-rods or scales E are dispensed with.

The wool to be weighed and measured is placed into and pressed down in the receptacle C in small quantities at a time until the receptacle contains a sufficient bulk. The weight F is then superposed and the final pressure applied.

It will be observed from a reference to the drawings that the weight F is provided with a pointer, H, and has a mirror, $x$, fixed upon its inclined upper part, as shown at Figs. 3, 5, and 6, this mirror being so arranged that the operator above can easily read off the indications of the pointer H as it moves over the face of a scale, I, fixed to the interior of the receptacle C, and which is shown in section at Fig. 3.

Now, when the last instalment of wool has been added, the weight F superposed, and the final pressure applied, as aforesaid, the operator takes note of the position of the pointer H upon the scale I. The pressure is then withdrawn, and the natural elasticity of the wool causes the weight F to rise and the pointer H to move over the surface of the scale I, which is so constructed that the number of degrees passed through by the pointer H indicates the exact cubic contents of wool contained in the receptacle C.

To ascertain the weight of wool thus measured the weight F is removed, and the depth to which the float and receptacle have sunk is seen by comparing the position of the vessel or receptacle C, with relation to the scales J or E, with a previous observation made while the receptacle C was empty.

The scales J or E may be constructed to give any required degree of weight; for example, they may be divided into spaces indicating half an ounce of weight each, and thus if the float B and receptacle C have sunk, say, one hundred spaces or degrees, the weight of the contained wool is one hundred half-ounces, or whatever other degree of weight a space on the scale may represent.

To provide for the ready removal of the wool thus weighed and measured, slings G, constructed in the manner shown at Fig. 4 of the drawings, may be employed and placed in the receptacle C before it is filled with wool, which is thus packed upon the bottom plate of the slings, whose upper part may then be hooked or attached to a crane or other hoisting mechanism, by which the slings carrying the wool are raised out of the receptacle C.

In order to know how many per cent. the wool loses by washing or cleansing, a quantity of wool, properly washed and cleansed, is placed into the receptacle C in the manner hereinbefore described. The difference of sinking between clean and unclean wool is the loss of weight arising from the removal of grease, sand, earth, burrs, grass, or other foreign matter. The quantities of wool to be compared must of course be of equal cubic contents.

In order to ascertain the different degrees of fineness wool of every sort is pressed into the receptacle and weighed. Equal cubic contents of unequal fineness will give the degree of the latter by the percentage of weights.

By means of this apparatus the operator is enabled to ascertain the loss of wool by cleansing with perfect exactness, and in much less time than was hitherto necessary, and it also assists the wool merchant or manufacturer to buy wool according to its degree of fineness and profitableness.

I claim—

1. The outer vessel A, float B, and receptacle C, in combination with the scale I, to indicate the quantity of material, and the scale J or E, to indicate the gravity of the same, substantially as set forth.

2. The combination, with the receptacle C, of the weight F, scale I, and slings G, as and for the purposes set forth.

3. The weight F, in combination with the receptacle C, mirror $x$, pointer H, and scale I, substantially as hereinbefore described and shown.

FRIEDR. BOCKHACKER.

Witnesses:
 MORITZ POIESZ,
 ADOLPH GIEBELER.